United States Patent
Rovegno

(10) Patent No.: US 7,556,599 B2
(45) Date of Patent: Jul. 7, 2009

(54) DEVICE FOR METROLOGY BY LASER MAPPING FOR A VIDEOENDOSCOPIC PROBE

(75) Inventor: Jean Rovegno, La Ciotat (FR)

(73) Assignee: Tokendo, La Ciotat (FR)

( * ) Notice: Subject to any disclaimer, the term of this patent is extended or adjusted under 35 U.S.C. 154(b) by 810 days.

(21) Appl. No.: 11/096,768

(22) Filed: Apr. 1, 2005

(65) Prior Publication Data
US 2005/0240077 A1 Oct. 27, 2005

(30) Foreign Application Priority Data
Apr. 2, 2004 (FR) .................. 04 03512

(51) Int. Cl.
*A61B 1/04* (2006.01)
*A61B 1/07* (2006.01)

(52) U.S. Cl. .............. 600/175; 600/108; 600/176; 600/179; 600/182

(58) Field of Classification Search ............. 600/117, 600/118, 108, 175, 176, 179, 182
See application file for complete search history.

(56) References Cited

U.S. PATENT DOCUMENTS

| | | | |
|---|---|---|---|
| 3,595,220 A * | 7/1971 | Kawahara | 600/117 |
| 3,817,631 A * | 6/1974 | Kawahara | 356/3.11 |
| 3,819,267 A * | 6/1974 | Kawahara | 356/21 |
| 4,281,931 A | 8/1981 | Chikama | |
| 4,558,691 A * | 12/1985 | Okada | 600/117 |
| 4,588,294 A * | 5/1986 | Siegmund | 600/117 |
| 4,660,982 A * | 4/1987 | Okada | 356/636 |
| 4,727,859 A * | 3/1988 | Lia | 356/241.5 |
| 4,980,763 A * | 12/1990 | Lia | 348/67 |
| 5,468,238 A | 11/1995 | Mersch | |
| 5,633,675 A | 5/1997 | Danna et al. | |
| 5,669,871 A * | 9/1997 | Sakiyama | 600/117 |
| 6,063,023 A * | 5/2000 | Sakiyama et al. | 600/118 |
| 2004/0019255 A1* | 1/2004 | Sakiyama | 600/175 |
| 2004/0143162 A1* | 7/2004 | Krattiger et al. | 600/175 |
| 2004/0242961 A1* | 12/2004 | Bughici et al. | 600/108 |

FOREIGN PATENT DOCUMENTS

| | | |
|---|---|---|
| DE | 36 29 435 A1 | 3/1987 |
| FR | 2 630 538 | 10/1989 |
| GB | 2 269 453 A | 2/1994 |
| WO | WO 2004/000107 A2 | 12/2003 |

* cited by examiner

*Primary Examiner*—John P Leubecker
(74) *Attorney, Agent, or Firm*—Bachman & LaPointe, P.C.

(57) ABSTRACT

Videoendoscope including a distal endpiece, a laser source generating a laser beam and an optical formation device arranged to produce from the laser beam a calibrated light spot near a target of which the size is to be measured, wherein the laser source is housed in a distal endpiece, while the optical formation device is housed at least partially in a removable optical head that can be fitted on the distal endpiece.

19 Claims, 5 Drawing Sheets

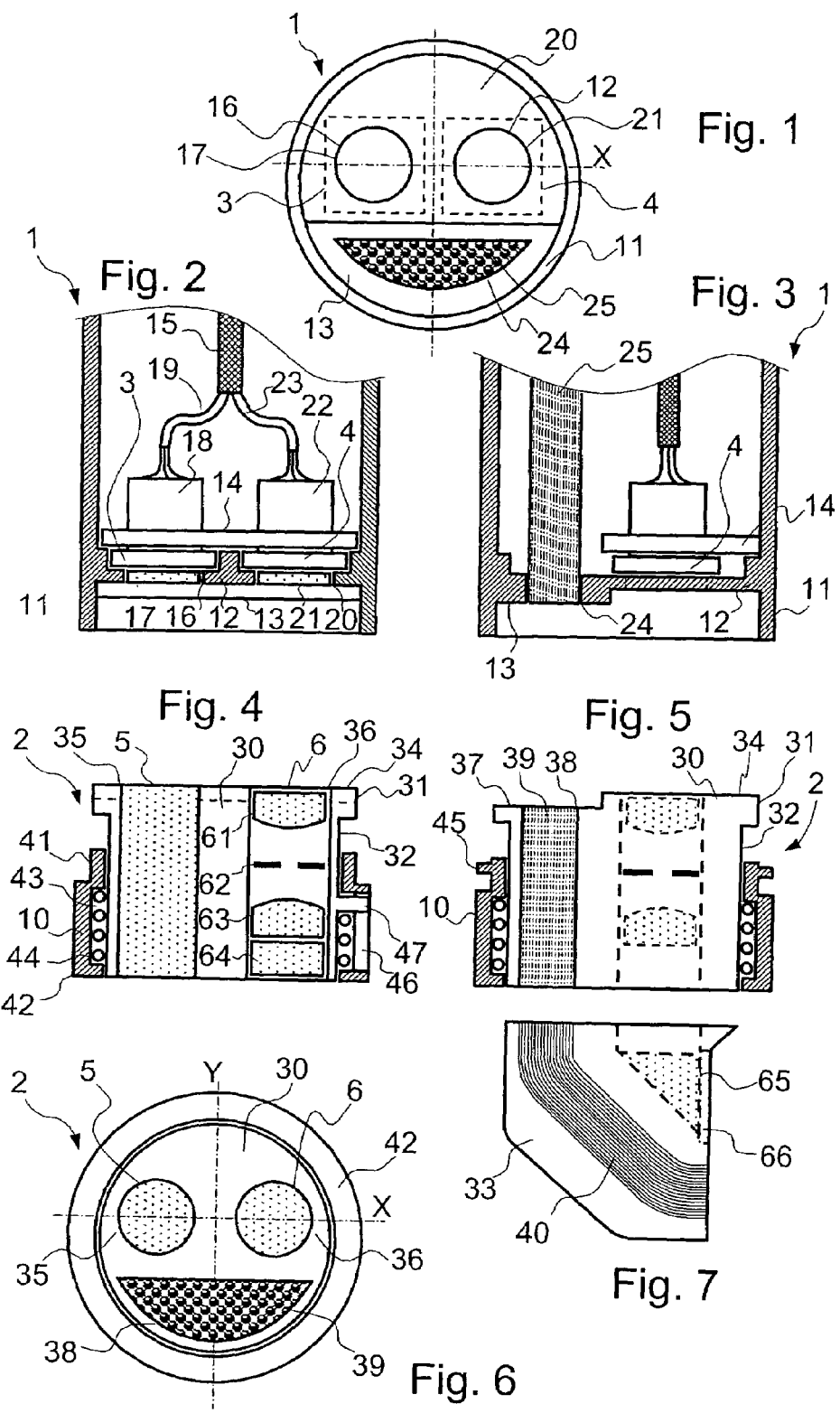

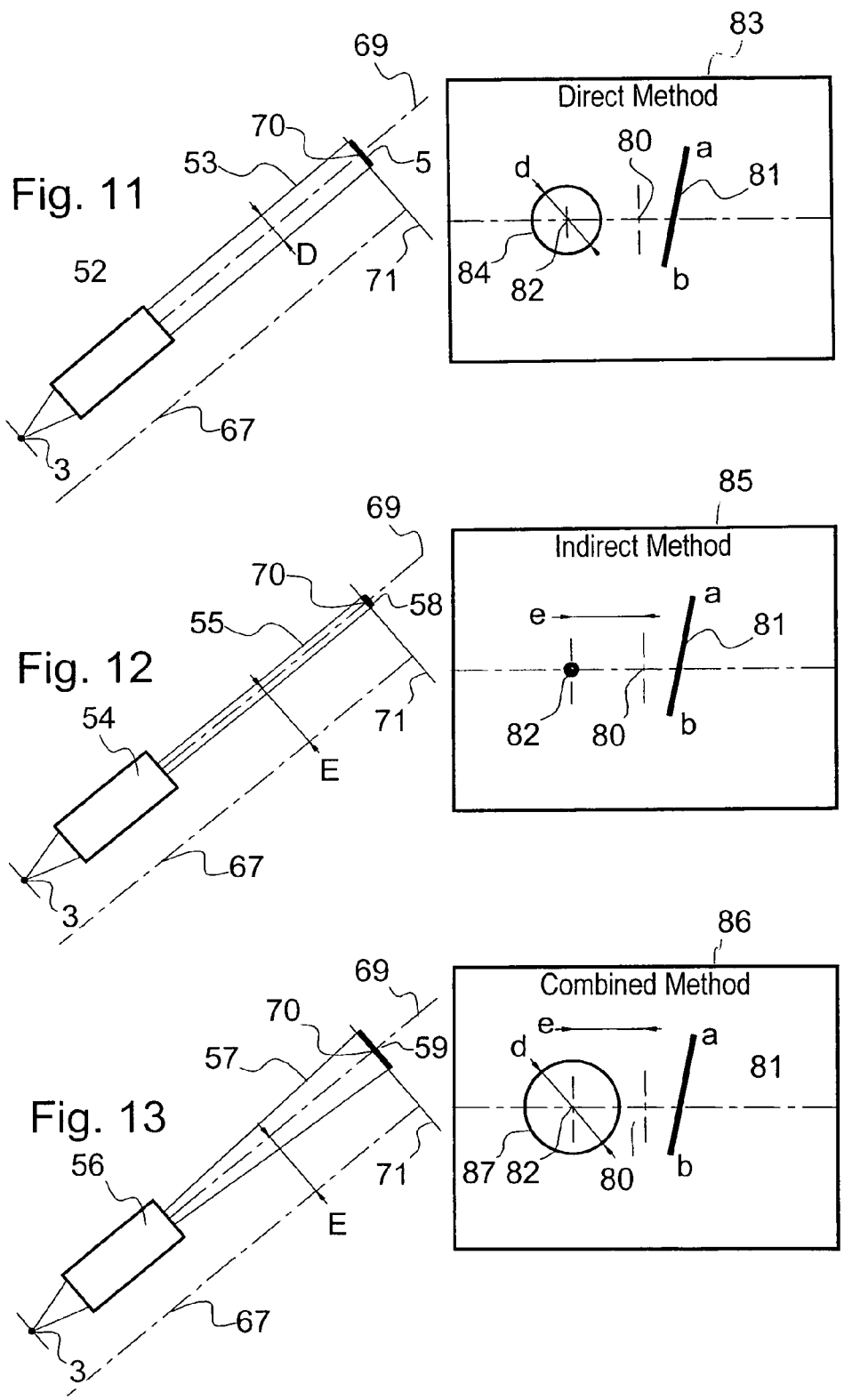

DEVICE FOR METROLOGY BY LASER MAPPING FOR A VIDEOENDOSCOPIC PROBE

BACKGROUND OF THE INVENTION

1. Technical Field

This invention relates to a device for measuring the size of a target located in the field of view of a videoendoscopic probe.

It is in particular, but not exclusively, applicable to industrial endoscopy.

The terms "endoscope" or "fiberscope" refer to a rigid or flexible probe intended to be inserted into a dark cavity and enabling the user to see through an eyepiece the image of a target located in the cavity. Such a probe therefore includes a target illuminator and an optical device providing the user with an image of the target. The optical device includes a distal objective, an image transport device that is rigid and consists of a series of lenses or flexible and consists of an ordered fiber optic bundle, and a proximal eyepiece in which the user can see the image of the target. The illumination device generally includes an illuminating fiber bundle of which the distal end, suitably arranged near the distal objective, illuminates the target when its proximal end is connected to a light generator.

The term "videoendoscope" refers to a flexible or rigid probe enabling the user to see on a video screen the image of a target located in a dark cavity. Therefore, a videoendoscope includes a target illuminator identical to that of an endoscope or a fiberscope and an optoelectronic device providing the user with a video image of the target. A videoendoscope can be produced by connecting the eyepiece of an endoscope or a fiberscope to the objective of an endoscopy camera, or can be specifically designed with a videoendoscopic probe, and include:

a distal endpiece housing an optoelectronic device including in particular a CCD sensor having a photosensitive surface on which the image, provided by the objective with which it is associated, is formed.

an inspection tube, which is most often flexible, of which the distal end is rigidly connected to the distal endpiece, a control handle rigidly connected to the proximal end of the inspection tube, a flexible umbilical connecting tube of which the distal end is rigidly connected to the control handle and the proximal end is intended to be connected to an external enclosure containing in particular a light generator and an electrical power source, an illumination fiber bundle housed in the umbilical tube, in the control handle, then in the inspection tube, and of which the distal end, housed in the distal endpiece, illuminates the target when its proximal end is connected to a light generator, a video processor transforming, into a useful signal, the electrical signal provided by the distal CCD sensor to which it is connected by a multiconductor power cable, and of which the synchronization is adjusted according to the length of the cable, a control panel enabling the operation of the video processor to be adjusted in particular according to the color temperature of the lighting of the target by the distal end of the illuminating fiber bundle of the videoendoscopic probe, and a video monitor connected to the video processor and implanted, preferably adjacent to the control handle.

The videoendoscopic probes can also have the following functions:

a distal hinged tip deflection enabling the direction of the distal endpiece of the probe to be adjusted, with the control handle including mechanical or electromechanical control means for actuating said tip deflection, interchangeable optical heads that can be fitted on the distal endpiece of the inspection tube and enabling the optical field covered by the videoendoscope and/or the directions of the videoendoscope illumination and optical axes to be modified, and a digital image freeze device for recording, mapping and processing images, which can be either a simple laptop computer with a video input, or a dedicated system controlled by the videoendoscope control panel which will preferably be located on the control handle.

As regards the inspection of mechanical parts, it may be desirable to complement the videoendoscopic probe display function with a metrology function enabling the user to directly measure the size of certain elements of a target being inspected. The integration of a metrology function in a videoendoscopic probe involves the implementation of a measuring method and measuring devices specific to this method.

The measuring devices used in videoendoscopy generally include the following two means:

an optical means integrated in the distal end of the videoendoscopic probe, for inserting an auxiliary image in the image of the target displayed on the video screen connected to the probe, this auxiliary image characterizing the real position of the target in the optical field covered by the probe, and a digital image processing means for enabling the user to map the ends of the video images of the target and the auxiliary image displayed on the video screen connected to the probe, and then for applying a computational algorithm enabling the real size of the target to be deduced from the mapping.

The implementation of the distal optical means specific to the chosen measuring method in a videoendoscopic probe should preferably involve the integration of this optical means in a distal measuring head that can be removed and interchanged with the conventional optical heads of the probe. It should be noted that if a removable measuring head is used, the mechanical devices enabling the head to be positioned and locked on the distal end of the videoendoscopic probe must satisfy strict precision criteria, while meeting the following more general requirements:

the establishment of continuity between the optical paths and the illumination paths of the videoendoscopic probe and the removable head, which requires the simultaneous implementation of a longitudinal lock and side indexing, the prevention of any possibility of accidental unlocking of the removable head, and the absence of CCD sensor pollution by parasitic light rays emanating from the probe's illumination path.

The mechanical means implemented to meet these requirements vary depending on the optical structure of the probe/removable head pair. Most often, as is the case in U.S. Pat. No. 4,727,859, the CCD sensor of the probe is securely attached to a distal optical device having a smaller frontal overall dimension than the CCD sensor. Under these conditions, this optical device can be housed in the distal portion of the probe which has a diameter smaller than that of the probe itself, so that it can be inserted into the proximal tubular end of removable heads having a diameter identical to that of the probe. This architecture has the advantage of simplifying the locking devices and the disadvantage of requiring another optical device in addition to that integrated in the probe to be housed in the removable heads. To reduce the overall length of the optical system, it would be more technically advantageous to house the entire optical system in the removable heads which are attached directly to the CCD sensor integrated in the probe, taking into account that, under these conditions, the mechanical locking devices are more delicate to produce.

2. Description of the Prior Art

The measuring methods used in videoendoscopy can be grouped into two categories, namely:

so-called direct measuring methods which involve simultaneously displaying, on the video screen of the videoendoscopic probe, an image of a known size reference associated with the target, which methods, under these conditions, involve mapping the ends of the image of the target and the image of the reference and applying a simple comparison algorithm enabling the real size of the target to be deduced from the mapping, and so-called indirect measuring methods which involve simultaneously displaying, on the video screen of the videoendoscopic probe, the image of the target of unknown size which is to be measured, and the image of an auxiliary element associated with the target, whose position on the video screen reflects a significant physical parameter of the measurement, such as, for example, the observation distance separating the target from the distal end of the videoendoscopic probe, which methods involve, under these conditions, mapping the image of the auxiliary element and the ends of the image of the target and applying an algorithm in order to deduce, from the mapping, the observation distance, the real coordinates in space of the ends of the target, and finally the real size of the target.

Various measuring methods used in videoendoscopy are briefly described below.

Direct Measurement by Comparison of Two Elements of the Target

This method involves simultaneously displaying two elements of the target located near one another, one of unknown size which is to be measured and the other of known size, then directly comparing the size of the video image of the unknown element with the size of the video image of the known element. This method, which is very simple to implement, cannot be used universally insofar as it is unusual to have an endoscopic image showing a reference element of known size located next to the target to be measured.

Direct Measurement by Gridding the Image of the Target

This method of modeling, described in patent JP 11045349, involves imbedding, by electronic means, a "three-dimensional" gridded network specific to the piece to be inspected into the video image provided by the videoendoscopic probe, then deducing the size of a target located on the piece, from the size of the grid in which the video image of said target is located. This method, which is very difficult to implement, is only of very limited practical interest.

Direct Measurement by Projection of a Collimated Laser Beam onto the Target

This method, which is described in patent GB 1 573 142, involves projecting in the viewing field of a video camera, a cylindrical collimated laser beam parallel to the optical axis of the camera so as to form near the target a circular reference light spot of known and unvarying size. The measurement of the size of the target involves directly comparing, on the video screen associated with the camera, the unknown size of the image of the target with the known size of the image of the reference light spot. This method, which was described in patent GB 2 269 453 in reference to an endoscope having an integrated laser fiber, is perfectly adaptable to videoendoscopy. Unfortunately, the small size of a collimator that can be integrated in the distal end of a videoendoscopic probe with a small diameter drastically reduces the diameter of the collimated laser beam. This limitation causes, from a relatively short observation distance, the generation of a video image of the laser spot having such a small diameter that any measurement by comparison would quickly become inaccurate.

U.S. Pat. No. 4,281,931 describes a variant of this direct measuring method, involving an annular collimated laser beam generated at the distal end of a laser fiber integrated in a side-view fiberscope.

Another variant of this method was used in a fiberscope described in patent DE 36 29 435 with two laser fibers integrated in the fiberscope and projecting, in the field of view, two laser beams parallel to the viewing axis so as to form, near a target located in the field of view, two light points separated by a known and unvarying distance. The measurement of the size of the target involves directly comparing, on the video screen associated with a camera connected to the eyepiece of the fiberscope, the unknown size of the image of the target with the known distance separating the images of the two light points.

The endoscopes of the current prior art in the field, implementing the direct measuring method described above, have the following limitations:

the transmission by an optical fiber of the laser beam generated by a proximal laser source, requires a proximal optical matching device which leads to losses, and a distal optical device for collimation of the light beam, of which the performance is limited by the size of the endoscope's distal endpiece, and the adaptation to the conditions for viewing of the optical field observed and the shape of the projected laser beam is impossible.

Indirect Measurement by Projection of a Laser Beam on the Target

This method, which is described in patent FR 2 630 538, involves projecting in the observation field of a video camera, a laser beam with an axis parallel to the optical axis of the camera and generated at a known distance from the optical axis, so as to form a light point near the target. The measurement of the real coordinates of the ends of the target are deduced by mapping, on the video screen associated with the camera, the image of the laser point and the ends of the image of the target. Moreover, this patent explicitly mentions the implementation of this method in endoscopy.

The inaccuracies of mapping the center of the video image of the laser point due to the absence of any collimation device associated with the distal end of the laser fiber integrated in a probe make the implementation of this videoendoscopy method more delicate than the direct measuring method described in the preceding paragraph. Nevertheless, this indirect measuring method is commonly used to naturally obtain observation distance measurements enabling the distal end of an endoscope to be positioned almost automatically at a predetermined distance from a target.

A variant of this method has thus been implemented in a fiberscope described in patent DE 36 29 435, using a laser fiber integrated in the fiberscope and projecting in the field of view a laser beam inclined on the viewing axis of the fiberscope so as to form on the target a light point generating an image of which the separation from the center of the image field is dependent on the observation distance.

A similar variant of this method has also been implemented in an endoscope described in patent FR 2 480 107, using a laser fiber integrated in the fiberscope and projecting in the field of vision a laser beam inclined on the viewing axis of the endoscope so as to form on the target a light point generating an image of which the coincidence with the center of the image field characterizes the mapping distance.

The endoscopes of the current prior art in the field, implementing the indirect measuring method described above, have the following limiting features:

the transmission by an optical fiber of the laser beam generated by a proximal laser source, requires a proximal optical matching device leading to losses, and the adaptation to the conditions for viewing of the optical field observed and the shape of the projected laser beam is impossible.

Indirect Measurement by Projection of an Auxiliary Image onto the Target

This method, which is described in patents DE 28 47 561 and U.S. Pat. No. 4,660,982, involves projecting onto the target viewed by an endoscope an auxiliary image generated by a mask associated with an objective integrated in the distal end of the endoscope's illumination device. The observation distance and the size of the target can be derived from the positioning and size in the image field of the endoscope's eyepiece, of the image of the target and of the image of the auxiliary image projected onto the target.

Although it is commonly used in videoendoscopy according to the implementation methods described in patents U.S. Pat. Nos. 4,980,763 and 5,663,675, this method has serious limitations concerning the depth of the field of measurement, due to the fact that the auxiliary image projected onto the target is clear only at a given observation distance. Beyond this observation distance, the video image of this auxiliary image is substantially blurry, which leads to imprecision in the mapping of this video image, as well as in the measurements derived therefrom.

Indirect Measurement by Image Doubling

This method involves forming on the sensitive surface of the distal CCD sensor of a videoendoscopic probe, two images of the target seen from different angles using two separate distal optical paths. The observation distance and the size of the target can then be derived using electronic tools for mapping and computing the relative positions and sizes of these two images on the probe video screen.

These two images can be simultaneously generated by two separate objectives placed in the distal end of the probe (U.S. Pat. No. 4,873,572, US 2002/0137986, U.S. Pat. No. 6,063, 023), or sequentially, owing to the alternate use of two aperture plates integrated in the distal objective of the probe and arranged symmetrically with respect to the optical axis (U.S. Pat. No. 5,222,477). The two methods mentioned above have serious problems concerning the integration of the required optical means in the distal end of a videoendoscopic probe with a small diameter.

Already mentioned in patents DE 34 32 583 and DE 41 02 614, a variant of this method which is more suitable for videoendoscopy was described in patent U.S. Pat. No. 6,411, 327. This variant involves placing in front of the distal end of the objective of a video camera, an image doubling device consisting of a single one-piece optical component having a planar distal surface and a proximal surface in the shape of a delta with a projecting edge. The limitations, both in width and in depth, of the optical field of measurement specific to this type of device unfortunately restrict the scope of use of this appealing method.

SUMMARY OF THE INVENTION

The present invention is intended to overcome these disadvantages and to provide a solution for metrology that is effective even for an endpiece of a videoendoscopic probe with a small diameter, of approximately 6 mm. This objective is achieved by producing a videoendoscope including a distal endpiece, a laser source generating a laser beam and an optical formation device arranged to produce, from the laser beam, a calibrated light spot near a target of which the size is to be measured.

According to the invention, the laser source is housed in the distal endpiece, and the optical formation device is housed at least partially in a removable optical head that can be fitted on the distal endpiece.

Advantageously, the laser source housed in the distal endpiece is made up of the distal end of an optical fiber of which the proximal end is connected to a laser diode.

Alternatively, the laser source housed in the distal endpiece is made up of a laser diode.

Preferably, the distal endpiece houses a video sensor of a video imaging device of the videoendoscope, wherein the laser diode is powered in pulsed mode slaved to a video signal produced by the video imaging device to cut the power of the laser diode outside of the video signal line scanning periods.

According to an embodiment of the invention, the optical formation device includes an optical collimator coupled to the laser diode in the distal endpiece.

According to an embodiment of the invention, the optical formation device produces a light beam parallel to an optical viewing axis of the videoendoscope.

According to an embodiment of the invention, the optical formation device produces a light beam comparable to a light ray producing a point near the target.

According to a first variant of the invention, the optical formation device produces a light beam with a circular cross-section of constant diameter.

According to a second variant of the invention, the optical formation device produces a divergent light beam with a circular cross-section.

According to an embodiment of the invention, the videoendoscope comprises means for determining a real size of the light spot calibrated as a function of the size of the spot viewed by the videoendoscope, the distance between an optical viewing axis of the videoendoscope and the axis of the light beam, and the distance between the center of a video image produced by the videoendoscope and the center of the calibrated light spot, and means for deducing the size of the observed target from the real size of the light spot.

According to an embodiment of the invention, the removable optical head further comprises reflection means for deflecting the laser beam and the optical viewing axis of the videoendoscope.

The invention also relates to an optical head including a distal camera objective designed to cooperate with a video imaging device housed in the distal endpiece of a videoendoscopic probe.

According to the invention, the optical head comprises attachment means for being removably attached to the distal endpiece of a videoendoscopic probe, and an optical formation device arranged to receive a laser beam of the videoendoscopic probe and form it into a calibrated light spot near a target of which the size is to be measured.

According to an embodiment of the invention, the optical head further comprising reflection means for deflecting the viewing angle of the camera's distal objective and the laser beam projected near the target.

Advantageously, the attachment means comprise finger-type means intended to cooperate with a bayonet slot provided on the distal endpiece of the videoendoscopic probe, and coupling means for ensuring proper alignment, first, of the optical axis of the camera's distal objective with the video imaging device of the videoendoscopic probe, and second, of the axis of the laser beam transmitted by the videoendoscopic probe with the optical axis of the optical formation device.

According to an embodiment of the invention, the optical head comprises an illuminating fiber bundle of which the distal end is intended to illuminate the target and the proximal end is intended to be coupled to the distal end of an illuminating fiber bundle provided in the videoendoscopic probe, in which the coupling means ensure proper alignment of the illuminating fiber bundle with the illuminating fiber bundle of the videoendoscopic probe.

According to an embodiment of the invention, the attachment means are formed on a locking tube capable of moving axially on the optical head between distal and proximal positions, and brought to the distal position by resilient return means, in which the coupling means are male-female-type means and are arranged so as to reach the coupled position at the end-of-travel so as to lock the attachment means, under the effect of the resilient return means.

According to an embodiment of the invention, the optical formation device produces a light beam parallel to an optical viewing axis of the videoendoscope.

According to an embodiment of the invention, the optical formation device produces a light beam comparable to a light ray producing a point near the target.

According to a variant of the invention, the optical formation device produces a light beam with a circular cross-section of constant diameter.

According to another variant of the invention, the optical formation device produces a divergent light beam with a circular cross-section.

BRIEF DESCRIPTION OF THE DRAWINGS

A preferred embodiment of the invention will be described below, as a non-limiting example, with reference to the appended drawings in which:

FIG. 1 shows a frontal view of the distal surface of the distal endpiece of a videoendoscopic probe according to the present invention;

FIGS. 2 and 3 show cross-section views, in perpendicular X and Y planes, respectively, of the distal endpiece shown in FIG. 1;

FIGS. 4 and 5 show cross section views, in longitudinal X and Y planes, respectively, of a removable distal axial-view measuring head capable of being connected to the distal endpiece shown in FIGS. 1 to 3;

FIG. 6 shows a frontal view of the distal surface of the removable distal measuring head shown in FIGS. 4 and 5;

FIG. 7 shows a cross-section view, in the longitudinal Y plane, of a removable side-view measuring head capable of being connected to the distal endpiece shown in FIGS. 1 to 3;

FIGS. 11, 12 and 13 show the implementation of three types of laser beam optical formation devices which can be integrated in the removable measuring head shown in FIGS. 4 to 7, as well as measuring methods associated therewith;

DETAILED DESCRIPTION OF A PREFERRED EMBODIMENT

Figure 8:
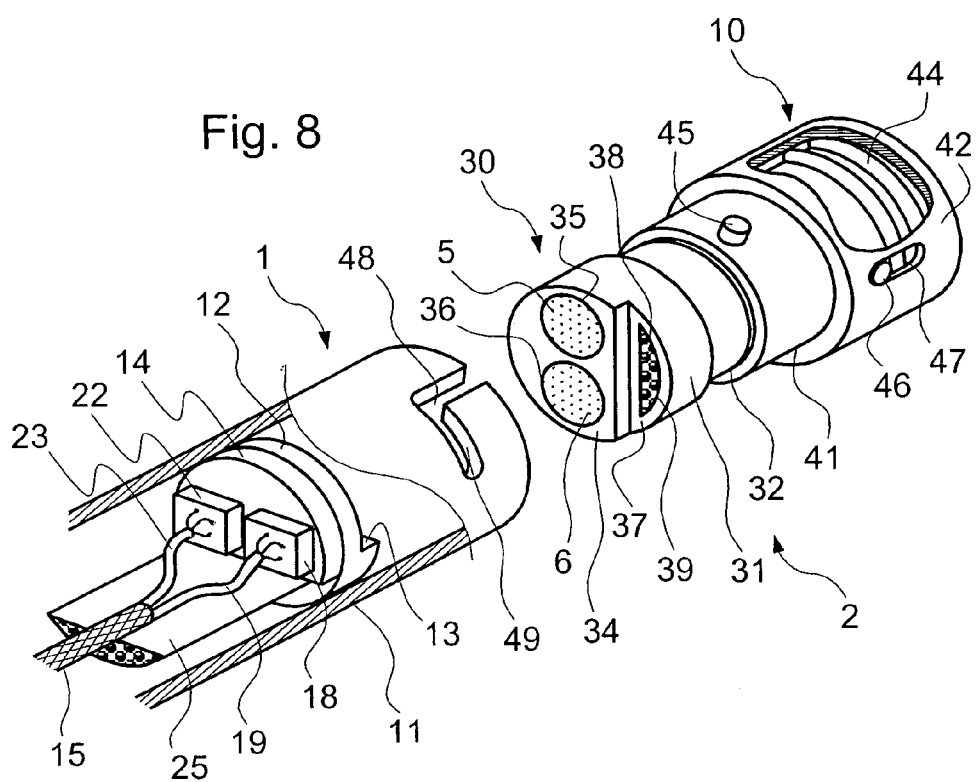
FIG. 8 shows a perspective view of the distal endpiece distal endpiece shown in FIGS. 1 to 3, and the removable measuring head shown in FIGS. 4 to 6 or 7.

FIGS. 1 to 3 schematically show the structure of a distal endpiece 1 of the videoendoscopic probe, which is the subject matter of the present invention, capable of receiving removable measuring heads described below in reference to FIGS. 4 to 7.

In FIGS. 1 to 3, the distal endpiece 1 includes a cylindrical tube 11 comprising an internal transverse partition 12 of which the proximal surface acts as a support for a printed circuit 14 on the distal surface, on which a microcircuit 4 supporting a CCD sensor and a microcircuit 3 supporting a laser diode preferably arranged on the horizontal symmetry axis X of the CCD sensor are implanted. The proximal surface of the printed circuit 14 acts as a support for an interface circuit 18 of the laser diode 3 and an interface circuit 22 of the CCD sensor 4. Multiconductor cables 19 and 23 housed in a sheath 15, connect the interface circuit 18 of the laser diode 3 to a proximal diode control circuit, and the interface circuit 22 of the CCD sensor 4 to a proximal video processor according to the modalities described below in reference to FIG. 9.

The transverse partition 12 has two circular apertures 16 and 20 preferably arranged so as to be symmetrically centered on the horizontal axis X of the CCD sensor 4. The aperture 16 that houses a protective lens 17 is centered on the laser diode 3, while the aperture 20 that houses protective lens 24 is centered on the CCD sensor 4. The transverse partition 12 further includes an off-center distal male projection having, for example, a curved profile with a rectilinear portion parallel to the horizontal symmetry axis X of the CCD sensor and a curved portion merging with the internal cylindrical surface of the tube 11. The distal male projection comprises an oblong aperture 24 housing the distal end of an illuminating fiber bundle 25 of the videoendoscopic probe.

FIGS. 4 to 6 schematically show the structure of a removable distal axial-view measuring head 2 capable of being connected to the distal endpiece 1 described above in reference to FIGS. 1 to 3.

In these figures, the mechanical structure of the measuring heads 2 results from the combination of a central core 30 and an annular locking device 10. The proximal cylindrical portion 31 of the core 30, intended to be housed in the distal end of the tube 11 of the endpiece 1, has a female recess 37 intended to act as a housing when it locks with the distal male projection 13 located on the transverse partition 12 of the distal endpiece 1. The distal cylindrical portion 32 of the core 30, which has a diameter smaller than that of the proximal portion 31 of the core, has an external radial finger 46 intended to longitudinally guide the locking device 10 surrounding the distal portion 32 of the core.

The annular locking device 10 that surrounds the distal portion 32 of the core 30 has a proximal cylindrical portion 41 with an external diameter that is compatible with the internal diameter of the tube 11 of the endpiece 1, and a distal cylindrical portion 42 with an external diameter identical to that of the distal endpiece 1. The proximal portion 41 of the locking device 10 has two diametrally opposite external radial fingers 45 intended to circulate, according to modalities described below in reference to FIG. 8, in two diametrally opposite bayonet-type slots provided in the distal portion of the tube 11 of the endpiece 1. The distal portion 42 of the locking device 10 has a closed longitudinal slot 47 into which the radial finger 46 with the distal portion 32 of the central core 30 circulates. This distal portion 42 also has an internal annular housing 43 containing a helical spring 44 contacting the radial finger 46 so as to exert a longitudinal pressure causing the finger to return to the proximal end of the longitudinal window 47.

The central core 30 of the distal axial-view measuring head 2 has three longitudinal apertures 35, 36 and 38. The cylindrical aperture 35, of which the proximal end, during locking, extends the circular aperture 16 provided in the transverse partition 12 of the endpiece 1 in the laser diode 3 axis, houses an optical device 5 for forming the light beam transmitted by the laser diode. The cylindrical aperture 36, of which the proximal end, during locking, extends the circular aperture 20 provided in the transverse partition 12 of the endpiece 1 in the axis of the CCD sensor 4, houses an objective forming the image of the target on the photosensitive surface of the CCD sensor. The objective can, for example, consists of two converging lenses 61, 63 and an aperture diaphragm 62. The oblong aperture 38, of which the proximal end provided in the female recess 37 extends, during locking, the oblong aperture 24 provided in the male projection 13 of the transverse partition 12 of the endpiece 1, and acts as a housing for an illuminating fiber bundle 39.

In FIG. 7, the structure of a removable side-view measuring head is derived from that of the removable axial-view measuring head 2 previously described in reference to FIGS. 4 to 6, by the addition on the central core 30 of these optical heads of a distal extension 33 shown in FIG. 7 and housing the following means:

a distal deflecting prism extending the objective 6 housed in the longitudinal cylindrical aperture 35 provided in the central core 30, a distal deflecting prism extending the optical device 5 for forming the laser beam, housed in the longitudinal cylindrical aperture 35 provided in the central core 30, and a distal bent extension 40 of the illuminating fiber bundle 39 housed in the oblong longitudinal aperture 38 provided in the central core 30.

FIG. 8 schematically shows the modalities for locking the removable measuring head 2 on the distal endpiece 1, which locking is performed in the following three phases.

In an insertion phase, shown in FIG. 8, the proximal cylindrical portion 31 of the central core 30 of the removable head 2 is inserted into the distal end of the tube 11 of the distal endpiece 1, until the two radial fingers 45 secured to the proximal portion 41 of the annular locking device 10 engage the distal ends of the open longitudinal slots 48 provided in the distal end of the tube 11.

At the end of a subsequent compression phase, during which the user has pressed the proximal portion 31 of the central core 30 of the removable head 2 into the distal end of the tube 11 of the distal endpiece 1 as far as it will go, the respective positions of the various elements of the endpiece and the head correspond to the configuration described below.

The proximal surface 34 of the central core 30 of the removable head 2 contacts the distal surface of the male projection 13 of the transverse partition 12 of the distal endpiece 1.

The proximal surface of the proximal portion 41 of the annular locking device 10 contacts the distal surface of the proximal portion 31 of the central core 30.

The two radial fingers 45 contact the proximal ends of the longitudinal slots 48. The radial finger 46 secured to the distal portion 32 of the central core 30 contacts the distal end of the closed longitudinal slot 47 provided in the distal portion 42 of the annular locking device 10. The helical spring 44 housed in the distal portion 42 of the annular locking device 10 is maximally compressed.

At the end of a subsequent locking phase, during which the user turns the proximal end of the head 2 inside the distal end of the endpiece 1 in the counter-clockwise direction, the respective positions of the various elements of the endpiece and the head correspond to the following configuration.

The proximal surface 34 of the central core 30 of the head 2 contacts the distal surface of the transverse partition 12 of the endpiece 1. The male projection 13 of the transverse partition is housed inside the female recess 37 provided in the proximal end of the proximal portion 31 of the central core 30 of the head 2.

The two radial fingers 45 contact the closed ends of the transverse slots 49.

The helical spring 44 is slightly extended with respect to the preceding phase so that the finger 46 is positioned in the middle portion of the slot 47.

The locking principle described above provides a high level of security and prevents any possibility of accidental unlocking. The unlocking of the removable head indeed requires the user, using a pointed tool, to push the finger 46 toward the distal end of the slot 47 before causing the head to rotate in the clockwise direction so as to remove the fingers 45 from the bayonet-type slots 48, 49 provided in the distal end of the tube 11 of the endpiece 1.

Figure 9:
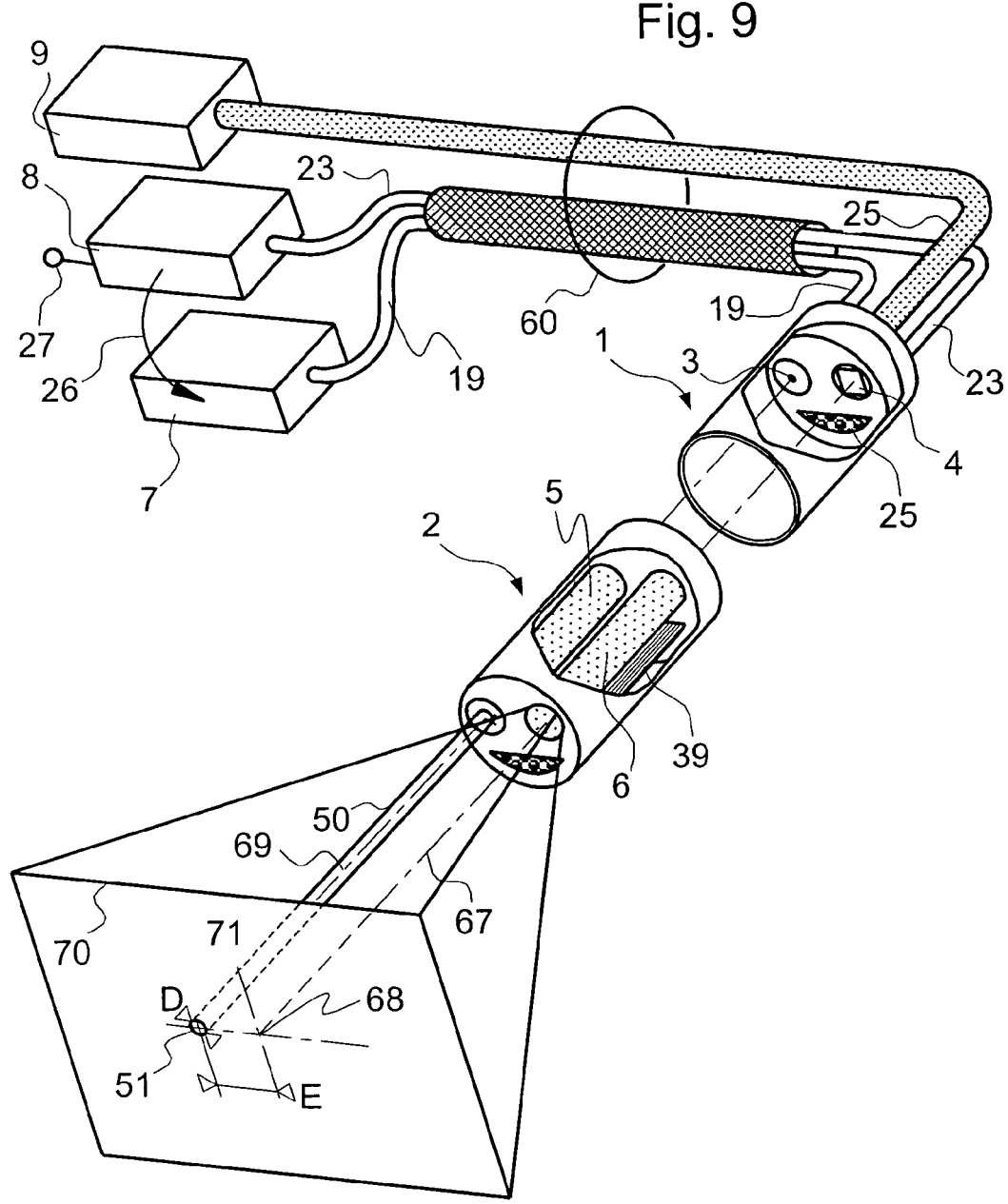
FIG. 9 shows a perspective view of a videoendoscopic probe including the distal endpiece shown in FIGS. 1 to 3 with a removable measuring head shown in FIGS. 4 to 6 or 7.

FIG. 9 schematically shows a videoendoscope produced by combining a videoendoscopic probe 60 according to the present invention, of which the proximal end is connected to operating devices 7, 8, 9 and of which the distal end consists of an endpiece capable of receiving removable heads 2.

The distal endpiece 1 houses a laser diode 3 connected to a power supply device 7 by a multiconductor cable 23, a CCD sensor 4 connected to a video processor 8 by a multiconductor cable 23, and the distal end of an illuminating fiber bundle 25 of which the proximal end is connected to a light generator 9. The laser diode 3 is preferably a small low-power diode (5 mw, for example) transmitting on low frequencies of the visible spectrum (655 nm, for example).

To avoid detrimental heating of the distal endpiece and in particular of the CCD sensor, the diode is advantageously powered in pulsed mode slaved to video scanning, in which the video processor 8 transmits, to the power supply device 7 of the laser diode, a control signal 26 prohibiting the power supply device 7 from supplying power to the laser diode outside of line scanning periods.

The removable head 2 houses an optical device 5 for forming the laser beam transmitted by the laser diode 3, an objective enabling an image of the target 71 to be formed on the photosensitive surface of the CCD sensor 4, and an illuminating fiber bundle 39 transmitting the light transmitted by the fiber bundle 25 so as to illuminate the target 71.

The optoelectronic device combining the CCD sensor 4 housed in the endpiece 1 and the objective 6 housed in the head 2 provides a viewing field with a rectangular cross-section centered on the optical axis 67 of the objective 6, which optoelectronic device displays, on a video monitor receiving the video signal 27 generated by the video processor 8, the images of targets located in a rectangular object plane 71 in the viewing field and perpendicular to the optical axis 67. The optoelectronic device combining the laser diode 3 housed in the endpiece 1 and the optical device 5 for forming the laser beam housed in the head 2 projects, in this viewing field, a laser beam 50 centered on an axis 69 preferably oriented parallel to the optical axis 67 and positioned in the horizontal symmetry plane of the optical field. Under these conditions, the laser beam 50 generates, in the rectangular object plane 71, a circular reference light spot 51 with a diameter D and of which the center 70 is located on the horizontal symmetry axis of the object plane 71 at a distance E from the center 68 of the object plane. Depending on the measuring method used, the reference parameter of the measurement will be either the diameter D if a direct measuring method by comparison is used, or the distance E if an indirect measuring method is used.

If the target of which the real length AB is to be measured is located in the object plane 71 perpendicular to the optical axis 67, the video image of the object field enables the image ab of the target AB and the image of the circular spot 51 to be displayed, with the latter image having a circular shape with a diameter d and of which the center is located in the horizontal symmetry plane of the video image at a distance e from the center of the image.

If the diameter of the video image of the circular spot 51 has a value great enough to be used, the operator can use a method for directly measuring the length of the target AB, which measurement requires prior knowledge of the supposedly constant diameter D of the collimated laser beam 50, and the following series of operations to be performed:

mapping the ends a and b of the image of the target AB, mapping the ends of a diameter d of the image of the reference spot 51, calculating the lengths ab and d, determining the length AB by applying the following formula:

$$AB = ab \times D/d \quad (1)$$

Regardless of the diameter of the video image of the spot 51, and even if this image is reduced to a point, the operator can also use an indirect measuring method. This method requires prior knowledge of the supposedly constant distance E separating the optical axis 67 from the axis 69 of the laser beam, and the following series of operations to be performed:

mapping of the ends a and b of the image of the target AB, mapping of the center of the image of the spot 51 and the center of the video image, calculating the lengths ab and e, determining the length AB by applying the following formula:

$$AB = ab \times E/e \quad (2)$$

The use of the measuring methods described above also requires the following practical precautions to be followed. Indeed, it is necessary first to use the tip deflection of the videoendoscopic probe so as to move the image of the target closer to the image of the laser spot on the video monitor, then to freeze the video image before beginning the measuring procedure. It is also necessary to integrate into the measuring procedure the correction parameters provided by a correction table, so as to automatically correct the optical deformations caused by the objective of the probe.

More generally, the following remarks should be made regarding the use of an endoscopic measuring method by projecting a laser beam near the target.

The small frontal size of a videoendoscopic probe limits both the diameter of the laser collimator that can be integrated in such a probe as well as the distance separating the axis of the laser beam from the optical axis of the probe's objective. Under these conditions, variation curves based on the observation distance both of the diameter d of the video image of a laser spot and of the distance e separating the center of the image from the center of the video screen rapidly and asymptotically move toward a null value, thereby rendering any measurement, whether direct or indirect, imprecise, beyond a certain observation distance. Although an electronic enlargement of the video image and/or the choice of a display objective with a longer focal length enable this limit distance to be moved back, it is advisable to provide, in the measuring program, a signal for alerting the user if he or she exceeds an observation distance, beyond which the distortion of the measurement's precision would become unacceptable.

The measuring methods by direct comparison of the size of the video image of a target and the size of the video image of a circular reference laser spot have the advantage of being capable of visually using the image of the spot as a "caliber" enabling the seriousness of the defects to be assessed intuitively. Moreover, the computer analysis of geometric features of the video image of an elliptical laser spot resulting from the projection of a collimated cylindrical laser beam onto an inclined object plane on the optical axis of the probe makes it possible to measure the size of defects located in a plane that is not perpendicular to the optical axis. This type of measurement is impossible to perform with an indirect method involving the display of a single laser point.

Figure 10:
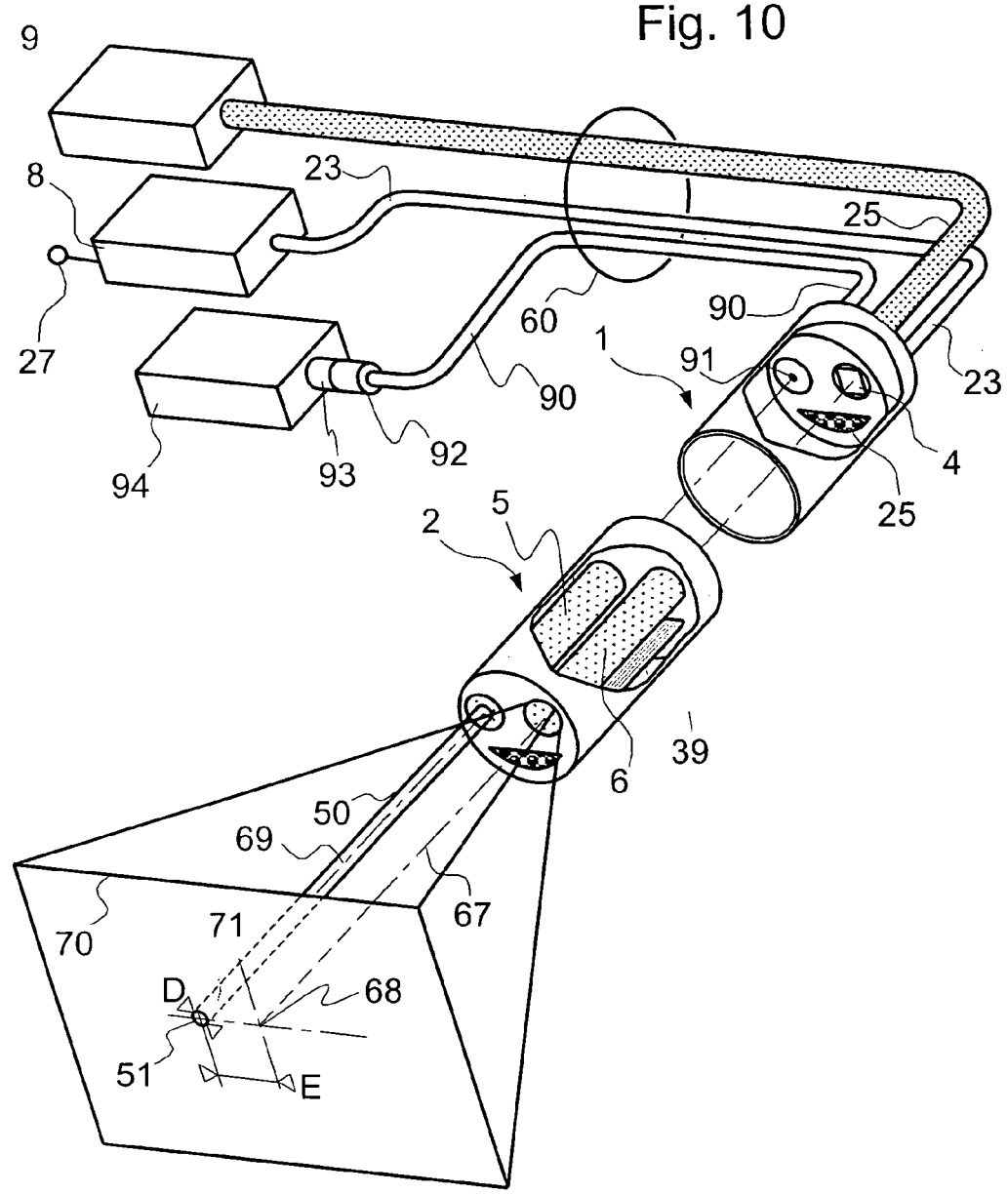
FIG. 10 shows a perspective view of a variant of the videoendoscopic probe shown in FIG. 9.

FIG. 10 shows a variant of the videoendoscope shown in FIG. 9. In this figure, the distal endpiece 1 of the videoendoscopic probe houses the distal end 91 of a laser fiber 90 connected to a laser diode 93 by means of an optical matching device 92, in which the laser diode is connected to a power unit 94. As previously described in reference to FIG. 9, the removable head houses an optical device 5 for forming the laser beam.

FIGS. 11, 12 and 13 show the implementation of three types of optical devices 52, 54, 56 for forming a laser beam, which devices can be integrated in a removable measuring head 2, as well as measuring methods associated therewith.

The purpose of the optical devices is to transform the divergent light beam transmitted by the laser diode 3 integrated in the distal endpiece of the videoendoscopic probe into a calibrated beam having a symmetry axis 69 parallel to the optical axis 67 of the objective integrated in the removable head, and producing a circular light spot on an object plane 71 perpendicular to the optical axis 67 and containing the target AB to be measured. The image shown by the video monitor associated with the videoendoscopic probe displays the video image 81 having a length ab of the target AB, in which the center 80 of the video image is the video image of the projection of the optical axis 67 on the plane 71, and the point 82 preferably located on the horizontal symmetry axis of the video image is the video image of the center 70 of the light spot produced by the laser beam on the plane 71.

The optical devices 52, 54, 56 include one or more optical components (such as: conventional lenses, graded-index lenses, aspherical lenses, anamorphic lenses, . . . ) making it possible to correct the ovalization of the beam transmitted by the laser diode, and to generate a light beam producing light spots having the clearest possible contour. Alternatively, an optical collimator solidly attached to the laser diode 3 integrated in the distal endpiece can be housed in the distal endpiece of the videoendoscopic probe, and other optical components associated with the collimator can be housed in the removable measuring head.

FIG. 10 shows an optical device generating a cylindrical collimated laser light beam 53 with a constant diameter D generating a circular spot 51 with a diameter D on an object plane 71 perpendicular to the symmetry axis 69 of the beam and containing the target AB of which the length is to be measured. The video monitor associated with the videoendoscopic probe shows, under these conditions, an image 83, which is preferably frozen, in which the video image 81 of length ab of the target AB and the circular video image 84 of diameter d of the laser spot 51 of diameter D appear. The measuring method used involves directly comparing the length ab of the image 81 of the defect of unknown size with the diameter d of the image 84 of the laser spot of known size. The value of the diameter d is homothetic to that of the diameter D which is naturally limited due to the small frontal size of the endoscopic probe as described above. Moreover, the value of the diameter d decreases as a function of the observation distance from the defect AB. In such a context, the video image 84 of the laser spot is rapidly reduced to a bright spot making it impossible to perform a direct measuring method by comparison.

FIG. 11 shows an optical device 54 generating a collimated laser light beam 55 generating a light point 58 on an object plane 71 perpendicular to the beam and containing the target AB of which the length is to be measured. The video monitor associated with the videoendoscopic probe generates, under these conditions, an image 85, which is preferably frozen, in which the video image 81 of length ab of the target AB and a light point 82 located at a distance e from the center of the image appear, which point corresponds to the video image of the laser point 58 located at a distance E from the optical axis 67. The measuring method used involves comparing the length ab of the image 81 of the defect of unknown size with the distance e separating the image 82 of the laser point from the center 80 of the video image 85.

FIG. 12 shows an optical device generating a divergent laser light beam 57 generating a circular spot 59 of diameter. D on an object plane 71 perpendicular to the symmetry axis 69 of the beam and containing the target AB of which the length is to be measured. The video monitor associated with the videoendoscopic probe generates, under these conditions, an image 86, which is preferably frozen, in which the video image 81 of length ab of the target AB and the circular video image 87 of the laser spot 59 appear, which image's center 82, located at a distance e from the center of the video image, is itself the image of the center 70 of the laser spot located at a distance E from the optical axis 67. The first measuring phase involves comparing the diameter d of the image 87 of the laser spot with the distance e separating the center of the spot from the center 80 of the video image, which enables the diameter D of the spot to be obtained with the following formula:

$$D = d \times E / e \quad (3)$$

The second phase of the measurement involves comparing the length ab of the image 81 of the defect AB with the diameter d previously calculated from the image 87 of the laser spot by applying formula 1.

This method has the advantage of displaying on the screen a circular spot capable of acting as a reference, of which the diameter remains almost constant regardless of the observation distance of the defect. This method therefore makes it possible to perform calibration checks by visually comparing the length of the image ab of the defect AB with the diameter d of the circular image 87, and to measure defects located in an inclined plane on the optical axis 67 by analyzing the characteristics of the image of the oval laser spot resulting from the projection of the divergent laser beam 57 on the inclined plane.

The invention claimed is:

1. A videoendoscope comprising a distal endpiece, said distal endpiece comprising a distal end of an optical fiber having a proximal end connected to a light source, said light source being arranged to illuminate a target having a sized to be measured, said videoendoscope comprising an optical device being housed at least partially in an optical head removably secured on said distal endpiece and being arranged to produce a calibrated light spot near said target having a size to be measured, said videoendoscope also comprising a laser source generating a laser beam from which said optical device produces said calibrated light spot, and said laser source being housed in said distal endpiece, said optical head further comprising an optical fiber arranged to cooperated with said optical fiber in said distal endpiece.

2. The videoendoscope according to claim 1, wherein the laser source housed in the distal endpiece comprises a distal end of an optical fiber having a proximal end connected to a laser diode.

3. The videoendoscope according to claim 1, wherein the laser source housed in the distal endpiece comprises a laser diode.

4. The videoendoscope according to claim 3, further comprising a video imaging device including a video sensor housed in the distal endpiece, the laser diode being powered in pulsed mode slaved to a video signal produced by the video imaging device so as to cut the power of the laser diode outside of video signal line scanning periods.

5. The videoendoscope according to claim 3, wherein the optical device includes an optical collimator coupled to the laser diode in the distal endpiece.

6. The videoendoscope according to claim 1, wherein the optical device comprises means for producing a light beam parallel to an optical viewing axis of the videoendoscope.

7. The videoendoscope according to claim 1, wherein the optical device comprises means for producing a light beam comparable to a light ray forming a point near the target.

8. The videoendoscope according to claim 1, wherein the optical device comprises means for producing a light beam with a circular cross-section having a constant diameter.

9. The videoendoscope according to claim 1, wherein the optical device comprises means for producing a divergent light beam with a circular cross-section.

10. The videoendoscope according to claim 9, further comprising means for determining a real size of the calibrated light spot as a function of the size of the spot viewed by the videoendoscope, a distance between an optical viewing axis of the videoendoscope and the axis of the light beam, and a distance between a center of a video image produced by the videoendoscope and a center of the calibrated light spot, and means for deducing the size of the target from the real size of the light spot.

11. The videoendoscope according to claim 1, wherein the removable optical head further includes reflection means for causing a deflection of the laser beam and the optical viewing axis of the videoendoscope.

12. An optical head including a distal camera objective designed to cooperate with a video imaging device housed in a distal endpiece of a videoendoscope probe, an optical fiber having a distal end being arranged to illuminate a target having a size to be measured and having a proximal end being arranged to be coupled, through coupling means, to a distal end of a lighting optical fiber of said videoendoscopic probe, said coupling means ensuring proper alignment of said optical fiber having a distal end being arranged to illuminate a target having a size to be measured and said optical fiber of said videoendoscopic probe, said optical head comprising attachment means for being removably attached to the distal endpiece of the videoendoscopic probe, and an optical beam forming device arranged to receive a laser beam from the videoendoscopic probe and to shape it so as to obtain a calibrated light spot near the target having a size to be measured.

13. The optical head according to claim 12, further comprising reflection means for deflecting a viewing angle of the distal camera objective and the laser beam projected near the target.

14. The optical head according to claim 13, wherein the attachment means comprise at least one finger intended to engage a bayonet-like slot provided on the distal endpiece of the videoendoscopic probe, and coupling means for ensuring proper alignment, of the optical axis of the distal camera objective with the video imaging device of the videoendoscopic probe, and of the axis of the laser beam transmitted by the videoendoscopic probe with the optical axis of the optical device.

15. The optical head according to claim 14, wherein the attachment means are formed on a locking tube movable axially on the optical head between distal and proximal positions, and brought to the distal position by resilient return means, wherein the coupling means are male-female type and are arranged so as to reach the coupled position at the end-of-travel so as to lock the attachment means, under the effect of the resilient return means.

16. The optical head according to claim 12, wherein the optical device comprises means for producing a light beam parallel to an optical viewing axis of the videoendoscope.

17. The optical head according to claim 12, wherein the optical device comprises means for producing a light beam comparable to a light ray producing a point near the target.

18. The optical head according to claim 12, wherein the optical device comprises means for producing a light beam with a circular cross-section having a constant diameter.

19. The optical head according to claim 12, wherein the optical device comprises means for producing a divergent light beam with a circular cross-section.

* * * * *